United States Patent
Zhu et al.

(10) Patent No.: US 12,487,809 B2
(45) Date of Patent: Dec. 2, 2025

(54) PROGRAM CODE UPDATE RECOMMENDATION BASED ON A HEATMAP

(71) Applicant: INTERNATIONAL BUSINESS MACHINES CORPORATION, Armonk, NY (US)

(72) Inventors: Bo Chen Zhu, Xi'an (CN); Peng Hui Jiang, Beijing (CN); Chu Yun Tong, Beijing (CN); Ai Ping Feng, Beijing (CN); Xinzhe Wang, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/843,262

(22) Filed: Jun. 17, 2022

(65) Prior Publication Data
US 2023/0409308 A1    Dec. 21, 2023

(51) Int. Cl.
*G06F 8/65* (2018.01)

(52) U.S. Cl.
CPC ...................... *G06F 8/65* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 8,381,188 B2 | 2/2013 | John | |
| 8,661,415 B2 | 2/2014 | Fanning | |
| 9,383,992 B2 | 7/2016 | Nigul | |
| 9,535,815 B2 | 1/2017 | Smith | |
| 10,365,985 B2 | 7/2019 | Wagner | |
| 11,204,756 B1* | 12/2021 | Samuel | ...................... G06F 8/65 |
| 2010/0077388 A1* | 3/2010 | Kimura | ............... G06F 11/3466 |
| | | | 717/163 |
| 2012/0222017 A1 | 8/2012 | Hinkle | |

(Continued)

FOREIGN PATENT DOCUMENTS

WO    2023/241851 A1    12/2023

OTHER PUBLICATIONS

"A method and system for recommending patches to customers", An IP.com Prior Art Database Technical Disclosure, Authors et al.: Disclosed Anonymously, IP.com No. IPCOM000248708D, IP.com Electronic Publication Date: Dec. 28, 2016, 4 pages.

(Continued)

*Primary Examiner* — Duy Khuong T Nguyen
(74) *Attorney, Agent, or Firm* — Stephen R. Yoder

(57) ABSTRACT

An approach for recommending an application of a software code update. The approach receives components of an executable program. The approach scans the components to divide the executable program into units. The approach creates a logical layer of entry lists, based on the units, for instantiations of the executable program. The approach loads the instantiations of the executable program based on the logical layers. The approach monitors the execution of the instantiations to increment counters based on executions of the units. The approach creates a heatmap of the executions based on the counters. The approach generates a recommendation to update the executable based on the heatmap.

17 Claims, 5 Drawing Sheets

(56) References Cited

U.S. PATENT DOCUMENTS

| | | | |
|---|---|---|---|
| 2012/0311540 A1* | 12/2012 | Fanning | G06F 11/3466 717/127 |
| 2016/0124834 A1* | 5/2016 | Davis | G06F 11/3636 712/227 |
| 2017/0255545 A1 | 9/2017 | Voccio | |
| 2017/0270026 A1* | 9/2017 | Kumar | G06F 11/3698 |
| 2020/0104198 A1 | 4/2020 | Hussels | |

OTHER PUBLICATIONS

"Provide Customers of Recommended Software Fixes Which Have Not Been Applied On Their System(s)", An IP.com Prior Art Database Technical Disclosure, Authors et al.: Disclosed Anonymously, IP.com No. IPCOM000223106D, IP.com Electronic Publication Date: Nov. 5, 2012, 2 pages.

Feldt et al., "Supporting Software Decision Meetings: Heatmaps for Visualising Test and Code Measurements", Software Engineering and Advanced Applications (SEAA), 2013 39th EUROMICRO Conference, Sep. 2013, 8 pages.

Mell et al., "The NIST Definition of Cloud Computing", Recommendations of the National Institute of Standards and Technology, Special Publication 800-145, Sep. 2011, 7 pages.

Fuerlinger et al., "On Using Incremental Profiling for the Performance Analysis of Shared Memory Parallel Applications", Euro-Par 2007, LNCS 4641, pp. 62-71, 2007.

International Search Report and Written Opinion, International Application No. PCT/EP2023/061694, International Filing Dtae May 3, 2023.

* cited by examiner

PROGRAM CODE UPDATE RECOMMENDATION BASED ON A HEATMAP

TECHNICAL FIELD

The present invention relates generally to updating program code, and specifically, to providing a recommendation for updating program code based on a generated heatmap.

BACKGROUND

In an enterprise level system, applying a code, e.g., software, firmware, etc., fix and/or patch involves a complex evaluation process before deployment. The goal is to verify that application of the fix is necessary and to avoid unnecessary risks associated with the deployment. Typically, a description of a fix or patch will not have sufficient technical detail to make an informed decision on deployment. Accordingly, it can be difficult to present a compelling description to a customer on the importance of a fix/patch, the urgency of deploying the fix/patch and the risks associated with deployment.

Currently, an available solution is applying a fix/patch on a regular frequency, e.g., scheduled releases, and manually evaluate all the included changes to decide if a fix/patch is applicable for deployment to address a specific problem. However, this mechanism does not guarantee a specific problem is corrected by a provided fix/patch, based on deployment feedback and customer support experience, a considerable portion of customer cases associated with specific problems have not been solved by a fix/patch released to correct identified specific problems.

BRIEF SUMMARY

According to an embodiment of the present invention, a computer-implemented method for recommending an application of a software code update, the computer-implemented method comprising: receiving, by one or more processors, components of an executable program; scanning, by the one or more processors, the components to divide the executable program into units; creating, by the one or more processors, a logical layer of entry lists, based on the units, for instantiations of the executable program; loading, by the one or more processors, the instantiations of the executable program based on the logical layer; monitoring, by the one or more processors, execution of the instantiations to increment counters based on executions of the units; creating, by the one or more processors, a heatmap of the executions based on the counters; generating, by the one or more processors, a recommendation to update the executable program based on the heatmap.

According to an embodiment of the present invention, a computer program product for recommending an application of a software code update, the computer program product comprising: one or more non-transitory computer readable storage media and program instructions stored on the one or more non-transitory computer readable storage media, the program instructions comprising: program instructions to receive components of an executable program; program instructions to scan the components to divide the executable program into units; program instructions to create a logical layer of entry lists, based on the units, for instantiations of the executable program; program instructions to load the instantiations of the executable program based on the logical layer; program instructions to monitor execution of the instantiations to increment counters based on executions of the units; program instructions to create a heatmap of the executions based on the counters; program instructions to generate a recommendation to update the executable program based on the heatmap.

According to an embodiment of the present invention, a computer system for recommending an application of a software code update, the computer system comprising: one or more computer processors; one or more non-transitory computer readable storage media; and program instructions stored on the one or more non-transitory computer readable storage media, the program instructions comprising: program instructions to receive components of an executable program; program instructions to scan the components to divide the executable program into units; program instructions to create a logical layer of entry lists, based on the units, for instantiations of the executable program; program instructions to load the instantiations of the executable program based on the logical layer; program instructions to monitor execution of the instantiations to increment counters based on executions of the units; program instructions to create a heatmap of the executions based on the counters; program instructions to generate a recommendation to update the executable program based on the heatmap.

Other aspects and embodiments of the present invention will become apparent from the following detailed description, which, when taken in conjunction with the drawings, illustrate by way of example the principles of the invention.

DETAILED DESCRIPTION

Figure 1:
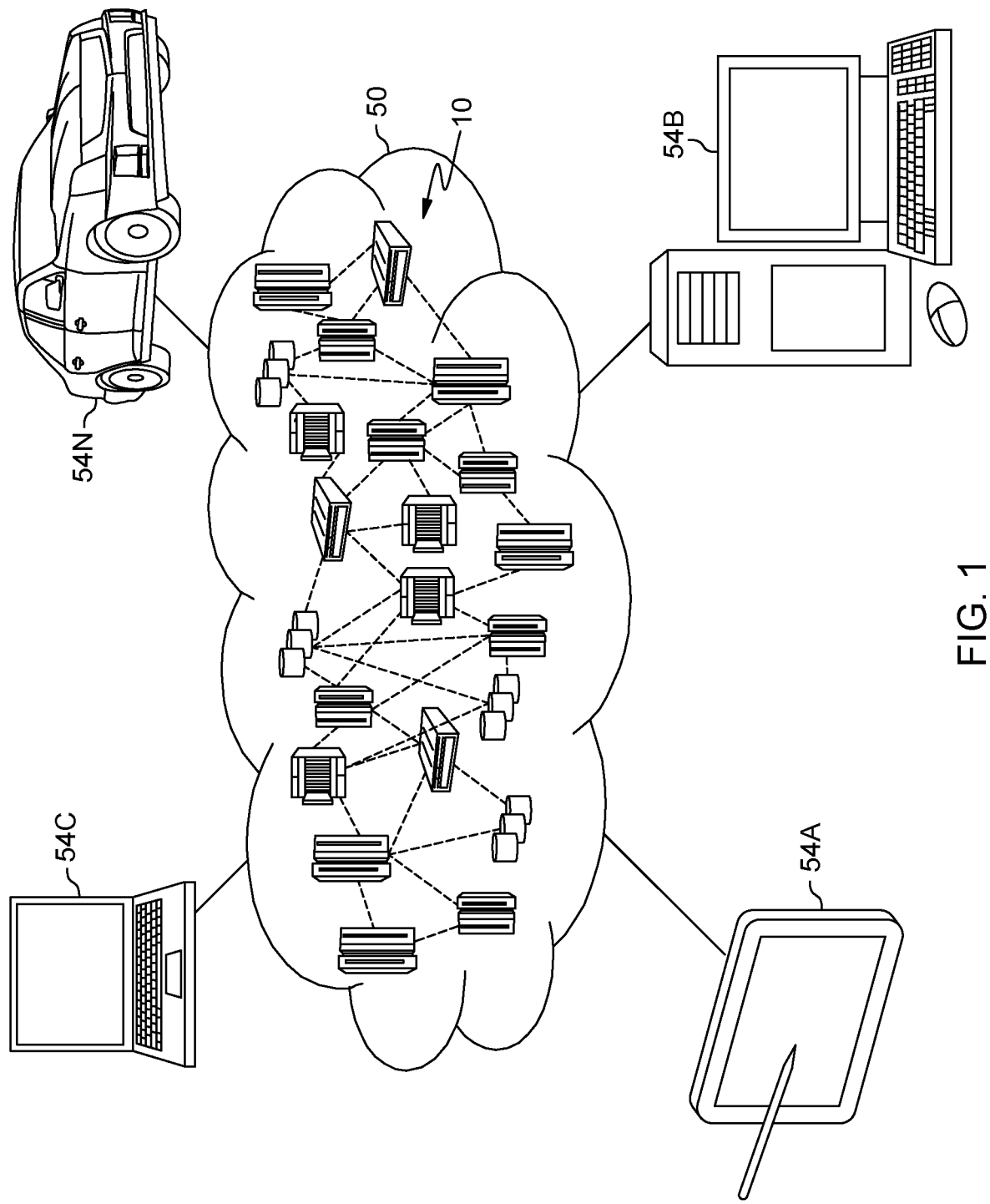
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for creating a code update recommendation based on a generated heatmap. The embodiments describe a mechanism which can generate a heatmap for code, e.g., software, firmware, microcode, etc., running in a system based on introducing a new logical layer of memory entries. The heatmap can show a workload pattern of a system. It should be noted that the workload pattern is important data which describes the running status for a system of interest. In another aspect of an embodiment, a recommendation rate can be calculated during the heatmap analysis which can be a good metric for a system administrator to make a decision on a deployment strategy and schedule for the code fix/patch.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
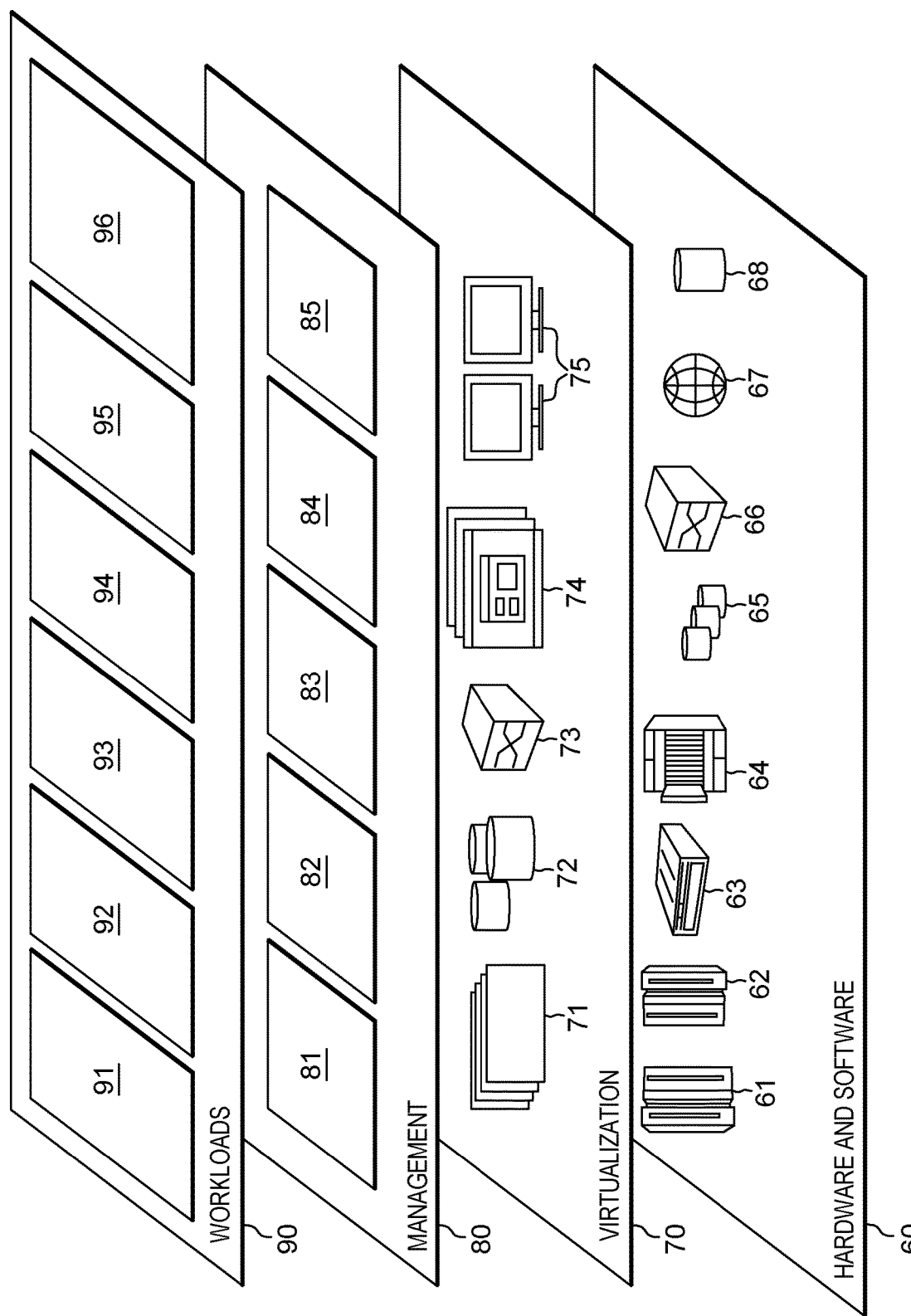
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and code update recommendation management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
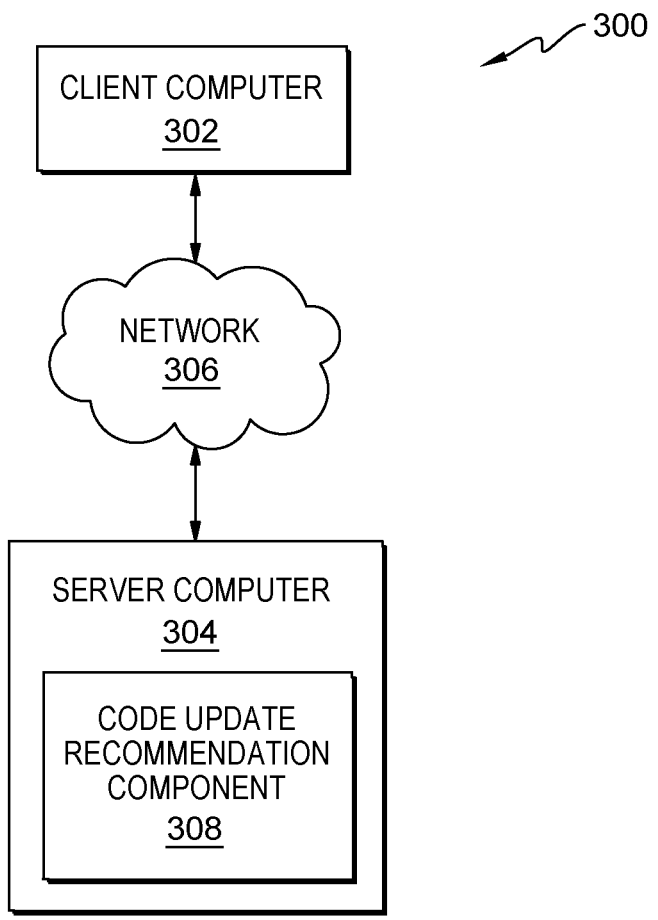
FIG. 3 is a high-level architecture, according to embodiments of the present invention.
Figure 4:
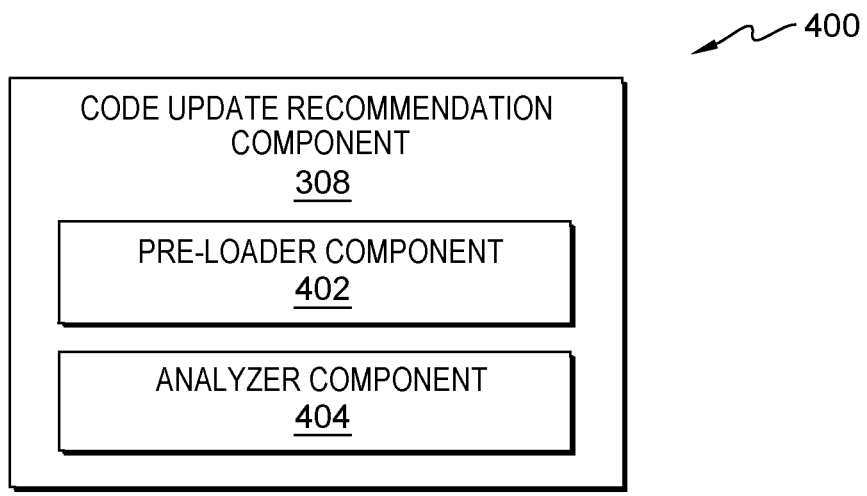
FIG. 4 is an exemplary detailed architecture, according to embodiments of the present invention.
Figure 5:
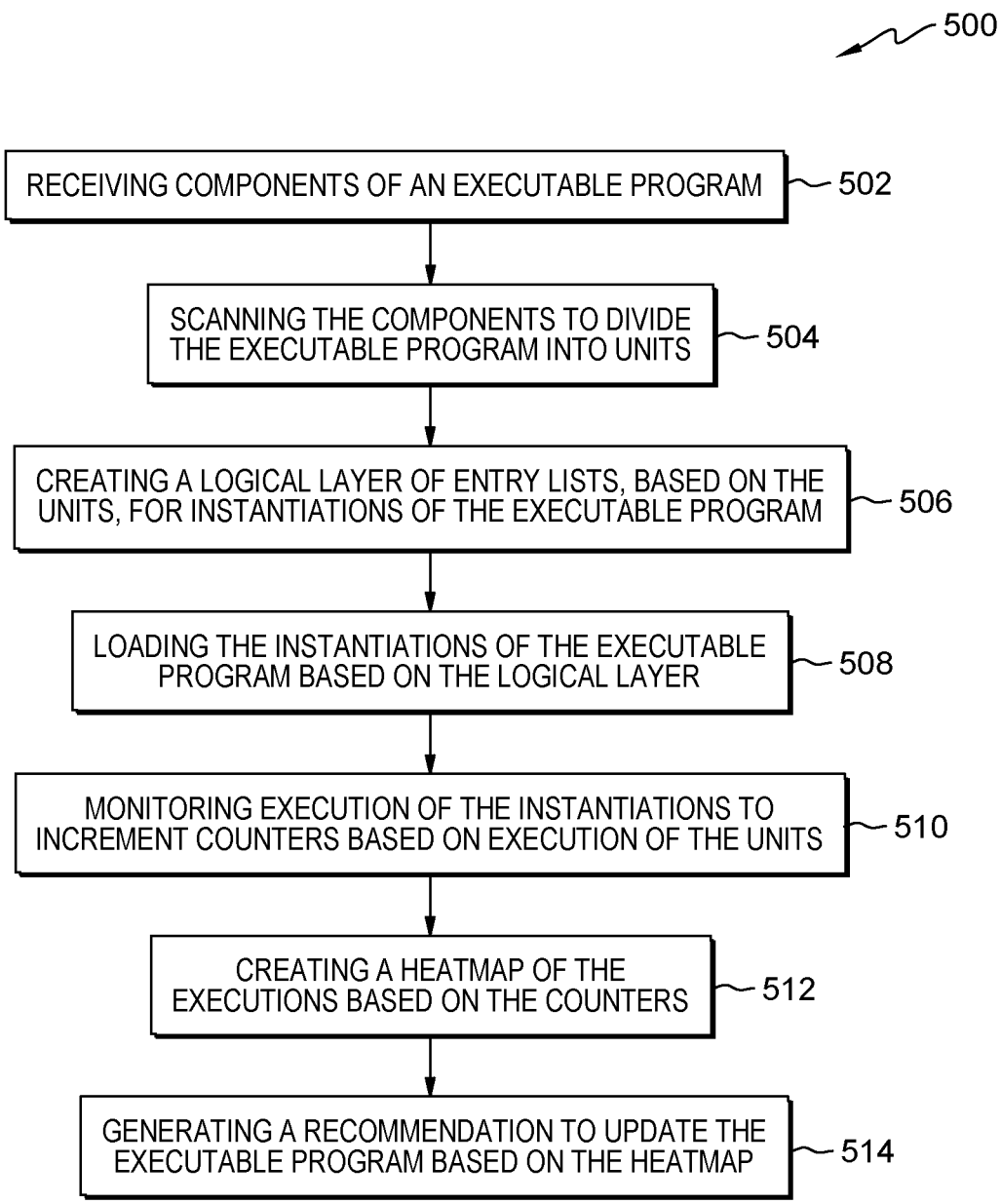
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a code update recommendation system, to which the invention principles may be applied. The architecture 300 comprises a client computer 302, a code update recommendation component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one aspect of an embodiment of the present invention, code update recommendation component 308, operational on server computer 304, can provide the capability to place executable units into a pre-loader (described subsequently) wherein an entry manager can assign entries for the executable units. It should be noted that loading a unit can depend on a user request. In another aspect of an embodiment of the present invention, code update recommendation component 308 can load the executable units into entries of a logical layer associated with the pre-loader component 402. In another aspect of an embodiment of the present invention, code update recommendation component 308 can employ a system loader to load the executable units to system memory from entries of the logical layer and update the logical layers with the status and characteristics of the loads.

In another aspect of an embodiment of the present invention, code update recommendation component 308 can provide the updated information from the entries of the logical layer to a system analyzer (described subsequently). While processors are executing the executable units, the system analyzer can monitor memory usage and logical layer entry information as a basis for generating a heatmap at the request of the logical layer. In another aspect of an embodiment of the present invention, code update recommendation component 308 can compare a generated heatmap from before the update was executed to a generated heatmap from after the update was executed and calculate a recommended rate of use of the modified code portions of the update.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a code update recommendation component 308, which can further comprise pre-loader component 402 and analyzer component 404.

In one aspect of an embodiment of the present invention, pre-loader component 402 can receive code that a product or application, e.g., a program, is loading and provide a scan of the code. In another aspect, the results of the scan can show the units, e.g., class, function, module, etc., based on a user defined criterion, divided by the programs.

In another aspect of an embodiment of the present invention, pre-loader component 402 can provide an entry manger to maintain this result. The entry manger can assign an entry list to a program, wherein units can be assigned to an entry associated with an order the units were loaded, e.g., a unique identifier.

In another aspect of an embodiment of the present invention, pre-loader component 402 can provide or employ a system loader to load the code by referring to the entries. In another aspect, the system loader will return the address in memory of the loaded code to pre-loader component 402. It should be noted that the loaded address of the entry can be the address pointed to by the entry instruction pointer (EIP). In another aspect of an embodiment, when the central processing unit (CPU) calls an instruction, the EIP can return the instruction to a register for execution.

In one aspect of an embodiment of the present invention at the product level, analyzer component 404 can employ a processor to call an instruction by memory address and return based on an EIP. In another aspect of an embodiment, analyzer component 404 can provide a gatherer function that can monitor the execution trace to collect information when there is a monitored instruction being executed. In another aspect of an embodiment, analyzer component 404 can provide a unit fetcher function that can check the entries in the logical layer to find the related unit. In another aspect of an embodiment, analyzer component 404 can provide a counter function that can count the number of the entries, creating a paired list that includes the entries and their execution times.

In another aspect of an embodiment of the present invention at the system level, analyzer component 404 can employ the processor to call the instruction by entry in the logical layer. In this regard, the execution trace can be monitored by the gatherer function that can collect information when a monitored entry is being called. In another aspect of an embodiment, analyzer component 404 can provide a counter function that can count the number of the entries, creating a paired list that includes the entries and their execution times.

In another aspect of an embodiment of the present invention, analyzer component 404 can provide a heatmap generator function. In one aspect, the heatmap generator of analyzer component 404 can generate a digital heatmap based on changing the entry order of the previously created paired list into an "x," "y" coordinate list from the entries and a depth list from the execution times. In another aspect of an embodiment, the heatmap generator function of analyzer component 404 can fill the pixels associated with the "x," "y" coordinate pairs and depth list with an initial value of zero to create a typical image with a size of (m, Max(n1, ..., nm)). In another aspect of an embodiment, the heatmap generator function of analyzer component 404 can create the heatmap based on normalizing the depth value into an acceptable range based on processor capabilities. It should be noted that if necessary, the heatmap can be compressed if there is a transform request.

In one aspect of an embodiment of the present invention, analyzer component 404 can provide a recommendation based on marking the heat scope associated with the fix wherein the code change and its impact can be identified. In another aspect of an embodiment of the present invention, analyzer component 404 can compare the generated heatmap with a heatmap generated from monitor data by the image algorithm when the system is running, creating a score which represents the heat rate of the marked scope. It should be noted that the score can be treated as a recommended rate for the applied update, providing the user the ability to adjust the apply strategy and schedule based on the score in view of the running system.

FIG. 5 is an exemplary flowchart of a method 500 for creating a code update recommendation based on a heatmap. At step 502, an embodiment can receive, via pre-loader component 402, components of an executable program. At step 504, the embodiment can scan, via pre-loader component 402, the components to divide the executable program into units. At step 506, the embodiment can create, via pre-loader component 402, a logical layer of entry lists, based on the units, for instantiations of the executable program. At step 508, the embodiment can load, via pre-loader component 402, the instantiations of the executable program based on the logical layer. At step 510, the embodiment can monitor, via analyzer component 404, execution of the instantiations to increment counters based on the execution of the units. At step 512, the embodiment can create, via analyzer component 404, a heatmap of the executions based on the counters. At step 514, the embodiment can generate, via analyzer component 404, a recommendation to update the executable program based on the heatmap.

Figure 6:
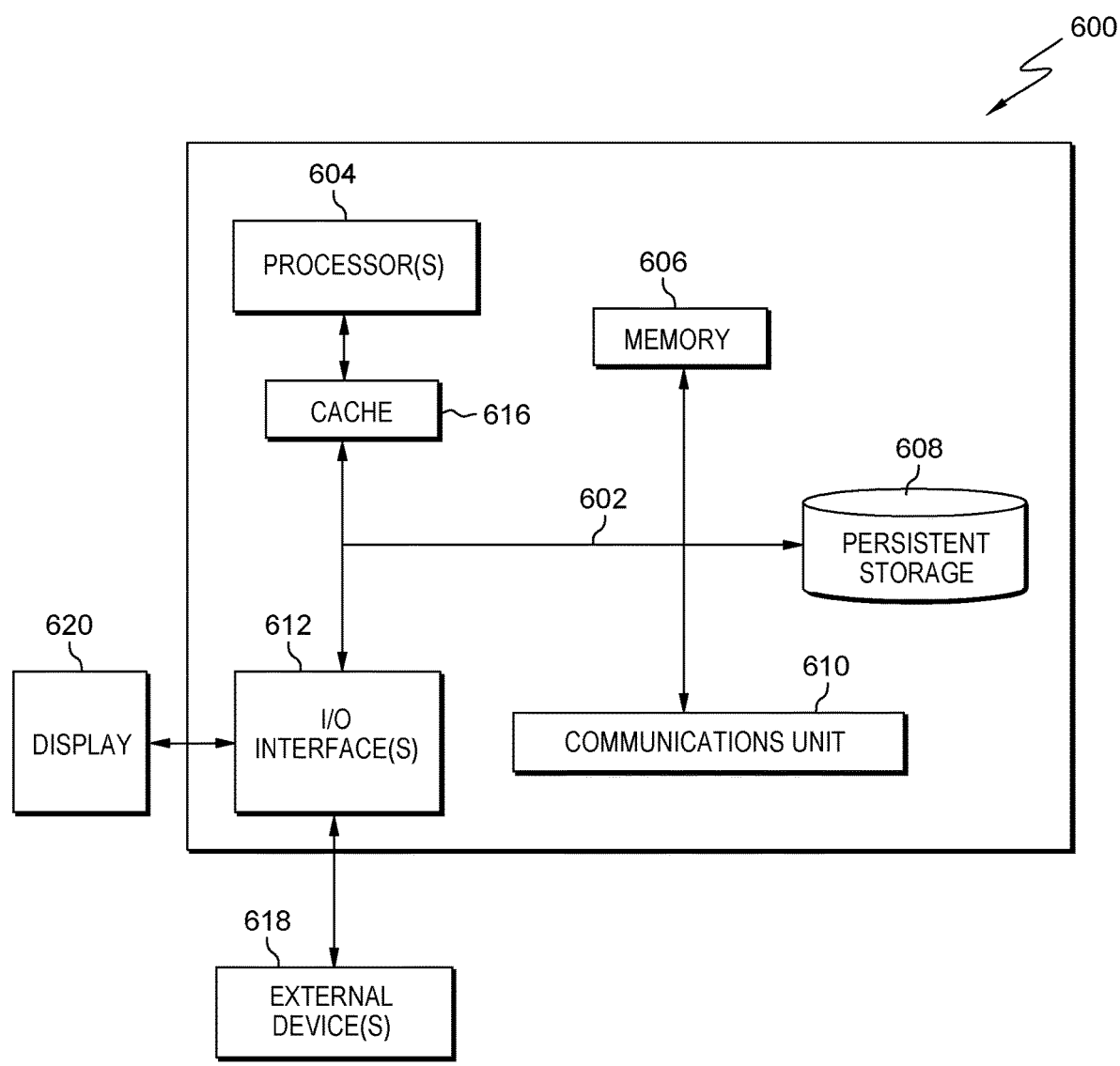
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recommending a deployment strategy for deploying a software code update, the computer-implemented method comprising:
   receiving, by a pre-loader module at a server computer, a software code update for a target program installed on a client computer, the software code update for updating the target program on the client computer;
   scanning, by the pre-loader module, the software code update to identify executable units of the software code update, the executable units being identified by the scan as one of class, function, or module;
   creating, in the server computer, a logical layer of entry lists for instantiations of the identified executable units;
   loading the instantiations of the identified executable units to system memory from the logical layer of entry lists;
   monitoring execution of the instantiations of the identified executable units to increment counters based on observed executions of the instantiations;
   creating a heatmap of the executions of the instantiations based on the counters; and
   generating a deployment strategy for deploying the software code update to update the target program, the deployment strategy including a recommended rate of use of the executable units at the client computer based on analysis of the heatmap.

2. The computer-implemented method of claim 1, wherein the monitoring can be made at an application level or at a system level.

3. The computer-implemented method of claim 1, wherein executable units are assigned unique identities based on their location in the logical layer of entry lists.

4. The computer-implemented method of claim 3, wherein the assigned unique identities are indicative of an order in which the executable units were loaded.

5. The computer-implemented method of claim 1, wherein an entry instruction pointer contains an address of an entry in the logical layer of entry lists to provide to a central processing unit (CPU) to execute.

6. The computer-implemented method of claim 5, wherein a first counter of the counters is incremented when the CPU returns from executing the address.

7. The computer-implemented method of claim 1, wherein creating the heatmap is further based on normalizing a depth value based on processor capabilities.

8. The computer-implemented method of claim 1, further comprising:
   updating the logical layers with status and characteristics data for the executable units when the instantiations of the executable program are loaded to the system memory.

9. The computer-implemented method of claim 1, wherein generating the recommendation includes:
   comparing a first heatmap illustrating use of application code in the target program from before the software code update was executed to the generated heatmap from after the software code update was executed; and
   calculating a recommended rate of use of modified code portions of the software code update.

10. A computer program product for recommending a deployment strategy for deploying a software code update, the computer program product comprising:
    one or more non-transitory computer readable storage media and program instructions stored on the one or more non-transitory computer readable storage media, the program instructions comprising:
    program instructions to receive, by a pre-loader module at a server computer, a software code update for a target program installed on a client computer, the software code update for updating the target program on the client computer;
    program instructions to scan, by a pre-loader module, the software code update to identify executable units of the software code update, the executable units being identified by the scan as one of class, function, or module;
    program instructions to create, in the server computer, a logical layer of entry lists for instantiations of the identified executable units;
    program instructions to load the instantiations of the identified executable units to system memory from the logical layer of entry lists;
    program instructions to monitor execution of the instantiations of the identified executable units to increment counters based on observed executions of the instantiations;
    program instructions to create a heatmap of the executions of the instantiations based on the counters; and
    program instructions to generate a deployment strategy for deploying the software code update to update the target program, the deployment strategy including a recommended rate of use of the executable units at the client computer based on analysis of the heatmap.

11. The computer program product of claim 10, wherein executable units are assigned unique identities based on their location in the logical layer of entry lists.

12. The computer program product of claim 10, wherein an entry instruction pointer contains an address of an entry in the logical layer of entry lists to provide to a central processing unit (CPU) to execute.

13. The computer program product of claim 12, wherein a first counter of the counters is incremented when the CPU returns from executing the address.

14. A computer system for recommending a deployment strategy for deploying a software code update, the computer system comprising:
    one or more computer processors;
    one or more non-transitory computer readable storage media; and
    program instructions stored on the one or more non-transitory computer readable storage media, the program instructions comprising:
    program instructions to receive, by a pre-loader module at a server computer, a software code update for a target program installed on a client computer, the software code update for updating the target program on the client computer;
    program instructions to scan, by a pre-loader module, the software code update to identify executable units of the software code update, the executable units being identified by the scan as one of class, function, or module;
    program instructions to create, in the server computer, a logical layer of entry lists for instantiations of the identified executable units;
    program instructions to load the instantiations of the identified executable units to system memory from the logical layer of entry lists;
    program instructions to monitor execution of the instantiations of the identified executable units to increment counters based on observed executions of the instantiations;

program instructions to create a heatmap of the executions of the instantiations based on the counters; and program instructions to generate a deployment strategy for deploying the software code update to update the target program, the deployment strategy including a recommended rate of use of the executable units at the client computer based on analysis of the heatmap.

15. The computer system of claim 14, wherein the monitoring can be made at an application level or at a system level.

16. The computer system of claim 14, wherein executable units are assigned unique identities based on their location in the logical layer of entry lists.

17. The computer system of claim 14, wherein an entry instruction pointer contains an address of an entry in the logical layer of entry lists to provide to a central processing unit (CPU) to execute and wherein a counter is incremented when the CPU returns from executing the address.

* * * * *